Dec. 31, 1940.  M. RONNING  2,226,583

CUTTER GUARD FOR HARVESTERS

Filed March 9, 1940

Inventor

MARTIN RONNING

By Carlsen + Hagle

Attorneys

Patented Dec. 31, 1940

2,226,583

UNITED STATES PATENT OFFICE 2,226,583

CUTTER GUARD FOR HARVESTERS

Martin Ronning, St. Louis Park, Minn., assignor to Minneapolis-Moline Power Implement Company, Minneapolis, Minn., a corporation of Delaware Application March 9, 1940, Serial No. 323,126

2 Claims. (Cl. 56—308)

This invention relates to improvements in cutter guards for the sickle mechanisms of such implements as harvesters, mowers, and the like.

The primary object of the invention is to provide an improved guard made up of spaced long fingers or teeth and intermediate, shorter stub fingers or teeth to thus combine good cutting qualities in upstanding dry grain or crop, with ease of penetration of damp and tangled down grain or crop. Another object is to provide a cutter guard of this kind wherein both long and short fingers have cutting engagement with the reciprocating sickle bar but with only the long fingers forwardly projecting from the path of the bar to thus provide adequate clearance between the long fingers and prevent clogging at the guard. A further object is to provide an improved guard assembly wherein the long and short fingers are cast and formed up in units for attachment to the supporting frame with each unit including one long and one short finger.

These and other more detailed and specific objects will be disclosed in the course of the following specification, reference being had to the accompanying drawing, in which—

Figure 1:
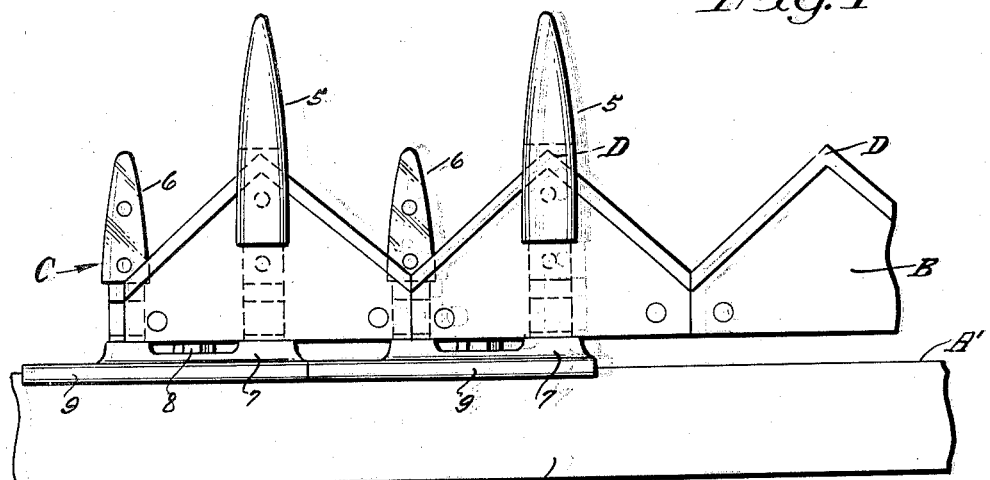
Fig. 1 is a plan view of a section of a cutter mechanism showing my improved guard structure and the relation of the sickle bar therewith.

Referring now more particularly and by reference characters to the drawing, A represents a frame member or bar which may form the main supporting part of the cutter mechanism as a whole, and along the forward side of which the sickle bar B and my improved cutter guard C are arranged. As here shown the member A is an angle iron and has a vertically disposed forward web A' upon which my guard C is conveniently mounted. The sickle bar B is of the usual form made up of a series of blades having sharpened forward edges which run to the points D, and the bar is of course reciprocated lengthwise through the guard by operation of the usual sickle driving mechanism, not here shown.

The guard C is made up of alternate long and short fingers or teeth 5 and 6 cast and made in units with one of each type of finger formed on a common base or mounting portion 7 adapted to fit flatly against the forward web A' of the bar A in end to end relation as shown. Bolts 8 passed through each base 7 and the bar hold the units in place and any twisting or turning is prevented by the formation of lips 9 along the upper margins of the bases and which overlie the upper margin of the bar A.

The short or stub fingers 6 are of the forwardly tapering shape shown and have the usual ledger plates 10 on their upper sides while the long fingers 5 have the ledger plates 11 with forwardly projecting ends 12 and rearwardly extending guard tail wings 13 which overhang the sickle bars and define a channel 14 through which the bar may operate. The sickle bar B operates in cutting relation with the ledger plates 10 and 11 of both long and short fingers, thus providing the maximum of cutting efficiency at all times.

Figure 2:
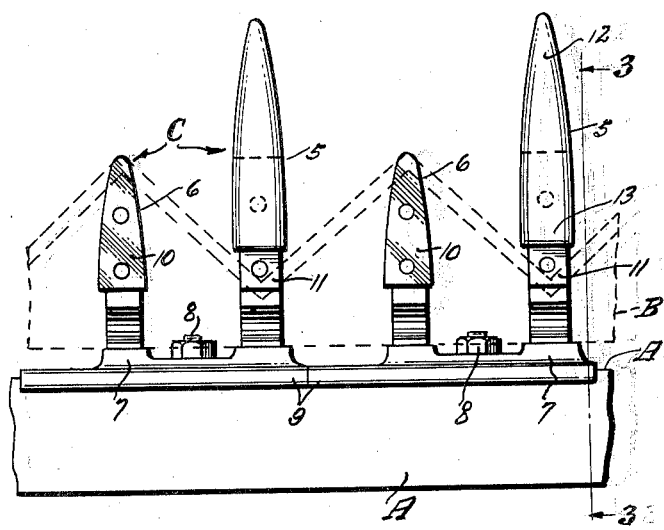
Fig. 2 is a similar view but with the sickle bar shown in dotted lines.
Figure 3:
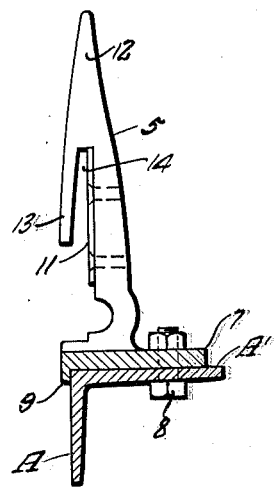
Fig. 3 is a cross section along the line 3—3 in Fig. 2.

An important feature of my invention, however, resides in the fact that the short fingers 6 do not extend forwardly of the path of the points D of the sickle bar B, as clearly shown in Fig. 2. Thus, while the forward projection of the long fingers 5 will of course aid greatly in the penetration of down, tangled, or damp crop, at the same time there will be adequate clearance between the fingers to prevent clogging and bunching of material on the cutter.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A crop cutting mechanism comprising, the combination with a mounting member and a reciprocating sickle bar having forwardly arranged cutting edges, of a guard device including spaced alternately long and short guard fingers extending forwardly from the mounting member, ledger plates on upper sides of both long and short guard fingers for cutting engagement with the sickle bar, the said short fingers terminating at forward ends in alignment with the forward edges of the sickle bar, and the said long fingers extending forwardly beyond the sickle bar to penetrate the crop.

2. A crop cutting mechanism comprising a mounting member, a sickle bar mounted for reciprocation in spaced relation to the forward edge of the mounting member, a guard comprising spaced long and short fingers having cutting engagement with the sickle bar, the short fingers being of such length that they will terminate in alignment with the forward edge of the sickle bar and the long fingers being of length sufficient to project substantially forward of the bar, one short and one long finger being formed upon a common mounting base adapted for mounting against a forward face of the mounting member in the space between the member and sickle bar, and a lip on each base overlying an upper forward edge of the mounting member to thereby prevent twisting movement of the base.

MARTIN RONNING.